(12) United States Patent
Hanson

(10) Patent No.: US 8,178,004 B2
(45) Date of Patent: May 15, 2012

(54) COMPOSITIONS FOR PROVIDING HYDROPHOBIC LAYERS TO METALLIC SUBSTRATES

(75) Inventor: Eric L. Hanson, Carlsbad, CA (US)

(73) Assignee: Aculon, Inc., San Diego, CA (US)

( * ) Notice: Subject to any disclaimer, the term of this patent is extended or adjusted under 35 U.S.C. 154(b) by 392 days.

(21) Appl. No.: 12/456,474

(22) Filed: Jun. 17, 2009

(65) Prior Publication Data

US 2009/0324834 A1 Dec. 31, 2009

Related U.S. Application Data

(60) Provisional application No. 61/133,364, filed on Jun. 27, 2008.

(51) Int. Cl.
*C23F 11/167* (2006.01)
*C23F 11/173* (2006.01)
*C09K 3/18* (2006.01)
*B05D 5/00* (2006.01)
*B05D 5/08* (2006.01)
*B05D 3/02* (2006.01)
*B05D 3/12* (2006.01)
*C10M 137/00* (2006.01)
*C09D 7/12* (2006.01)
*B32B 7/04* (2006.01)
*B32B 15/04* (2006.01)
*B32B 15/18* (2006.01)

(52) U.S. Cl. .......... 252/389.23; 252/389.24; 252/2; 252/8.05; 252/8.61; 106/287.24; 106/287.27; 106/287.29; 508/182; 508/423; 508/429; 508/431; 508/433; 558/114; 558/183; 558/203; 558/204; 558/177; 427/327; 427/327.2; 428/421; 428/142; 428/422

(58) Field of Classification Search .......... 558/114, 558/177, 183, 203, 204; 106/287.24, 287.27, 106/287.29; 252/2, 8.05, 8.61, 389.23, 389.24; 427/327, 372.2; 508/182, 423, 429, 431, 508/433, 441; 428/421, 142, 422
See application file for complete search history.

(56) References Cited

U.S. PATENT DOCUMENTS

| | | | |
|---|---|---|---|
| 3,787,351 A | 1/1974 | Olson | 260/40 R |
| 5,139,879 A | 8/1992 | Aharoni et al. | 428/422 |
| 5,392,156 A | 2/1995 | Kumagai et al. | 359/586 |
| 5,714,082 A * | 2/1998 | Boardman et al. | 252/8.62 |
| 5,738,802 A * | 4/1998 | Yamamoto et al. | 252/62.56 |
| 5,846,650 A * | 12/1998 | Ko et al. | 428/336 |
| 6,126,849 A * | 10/2000 | Yamana et al. | 252/8.62 |
| 6,274,060 B1 * | 8/2001 | Sakashita et al. | 252/8.62 |
| 6,455,142 B1 | 9/2002 | Heberger et al. | 428/215 |
| 6,645,644 B1 | 11/2003 | Schwartz et al. | 428/632 |
| 6,653,495 B2 | 11/2003 | Russo et al. | 558/114 |
| 6,734,227 B2 | 5/2004 | Jing et al. | 523/210 |
| 6,753,376 B1 * | 6/2004 | Yamana et al. | 524/544 |
| 6,828,284 B2 | 12/2004 | Howell et al. | 508/182 |
| 6,852,266 B2 | 2/2005 | Robinson et al. | 264/442 |
| 6,902,791 B2 | 6/2005 | Kawasato et al. | 428/141 |
| 6,905,754 B2 | 6/2005 | Jing et al. | 428/142 |
| 6,960,387 B2 | 11/2005 | Suzuki et al. | 428/336 |
| 7,141,140 B2 | 11/2006 | Maccone et al. | 162/135 |
| 7,691,478 B2 * | 4/2010 | Avaltroni et al. | 428/412 |
| 8,025,974 B2 * | 9/2011 | Hanson et al. | 428/421 |
| 2004/0247886 A1 | 12/2004 | Kudo et al. | 428/421 |
| 2005/0136180 A1 | 6/2005 | Pellerite et al. | 427/162 |
| 2006/0036005 A1 * | 2/2006 | Kanda et al. | 524/55 |

FOREIGN PATENT DOCUMENTS

| WO | WO 01/66353 A1 | 9/2001 |
|---|---|---|
| WO | WO 02/092646 A1 | 11/2002 |
| WO | WO 2004/058419 A1 | 7/2004 |
| WO | WO 2008/024475 A2 | 2/2008 |
| WO | WO 2008/060582 A2 | 5/2008 |
| WO | WO 2008/060583 A2 | 5/2008 |

* cited by examiner

*Primary Examiner* — Joseph D Anthony
(74) *Attorney, Agent, or Firm* — William J. Uhl

(57) ABSTRACT

A composition and method for forming a hydrophobic coating on a metallic substrate are disclosed. The composition comprises:
(a) a perfluorinated acid,
(b) a surfactant,
(c) an organic solvent, and
(d) water.
The composition is applied to the metal surface, the organic solvent and water permitted to evaporate and coalesce to form a substantially continuous film that preferably is in the form of a self-assembled monolayer covalently bonded to the surface of the substrate.

22 Claims, No Drawings

COMPOSITIONS FOR PROVIDING HYDROPHOBIC LAYERS TO METALLIC SUBSTRATES

CROSS REFERENCE TO RELATED APPLICATION

The present application claims priority from U.S. Provisional Patent Application Ser. No. 61/133,364, filed Jun. 27, 2008.

FIELD OF THE INVENTION

The present invention relates to hydrophobic compositions or compositions that provide hydrophobic layers to metallic substrates.

BACKGROUND OF THE INVENTION

For both industrial and household applications, it is desirable to provide hydrophobic coatings or layers to metallic substrates. Although compositions containing hydrophobic materials, such as polysiloxanes and fluorinated materials, can be applied to metallic surfaces, such compositions often lack permanency and durability. Also, such compositions are often based on organic solvents that can provide environmental problems. It would be desirable to provide a hydrophobic composition that is aqueous based and contains hydrophobic constituents such that when applied to a metallic substrate such as stainless steel forms a somewhat permanent layer, that is, a layer that is not easily removed by rubbing with steel wool or with cloths soaked with cleaning solutions.

SUMMARY OF THE INVENTION

The present invention provides a composition providing a hydrophobic composition to a metallic substrate. The composition comprises:
  (a) a perfluorinated acid capable of forming a self-assembled monolayer on a metallic substrate,
  (b) a fluorinated surfactant,
  (c) an organic solvent, and
  (d) water.

The invention also provides a method for providing a hydrophobic coating or layer to a metallic substrate which comprises contacting the metallic substrate with the composition described above; coalescing the composition on the substrate to form a substantially continuous film while removing organic solvent from the film so as to adhere the perfluorinated acid to the metallic substrate.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

The term "acid" is meant to include substances that donate a proton in a chemical reaction to a base. The term "acid derivative" is meant to include materials that behave similarly to acids such as acid salts, and acid esters, particularly lower alkyl esters containing from 1 to 4 carbon atoms.

The term "solutions" is meant to include homogeneous mixtures of one substance in another. Liquid solutions are optically clear because the particle size of the dissolved material is less than the wavelength of visible light. The term "dispersions" are meant to include non-homogeneous mixtures of one substance in another. Liquid dispersions are translucent and also include emulsions that are optically opaque because the particle size of the dispersed particle is greater than the wavelength of visible light. The dispersed material itself may be of such particle size or it may associate with itself or the dispersing medium forming micelles.

The term "metal" or "metallic" is meant to include metals, metal alloys and metalloids.

The metallic substrates have groups on their surface that are reactive with the acid group associated with the perfluorinated acid such as metal oxide and/or hydroxyl groups.

Examples of materials which form metal oxide surfaces and surfaces containing hydroxyl groups upon exposure to ambient conditions include iron substrates such as steels, including stainless steels, such as T-201, T-304, T-430, 316 and 17-4 and metals which acquire a non-ablating oxide coating upon exposure to the ambient environment, for example, tantalum, copper, aluminum and their respective alloys. The metal substrate can also be a composite in which the metal such as steel is coated with a coating of other metals and materials such as silicon, tantalum and copper and hard coatings such as chromium, platinum, titanium, chromium oxide, chromium nitride, aluminum oxide, etc. See, for example, U.S. Pat. No. 3,754,329. Besides the metals and metal compounds mentioned above, the substrate may comprise a metalloid such as silicon, a metal alloy such as an aluminum alloy such as a zinc-aluminum alloy.

Examples of suitable perfluorinated acids are perfluorinated hydrocarbons including oxygen-substituted hydrocarbons that are monomeric or polymeric in nature having an actual or number average molecular weight of 100 to 1,000,-

000. Such materials are typically represented by the following structure:

  (1)

where X is an acid group, $R_f$ is a perfluorinated hydrocarbon group including an oxygen-substituted hydrocarbon group, such as a perfluorinated alkyl group or a perfluorinated alkylene ether group and p is 0 to 18, preferably 0 to 4.

Examples of perfluoroalkyl groups are those of the structure:

  (2)

where Y is F or $C_nF_{2n+1}$; m is 4 to 20 and n is 1 to 6.

Examples of perfluoroalkylene ether groups are those of the structure:

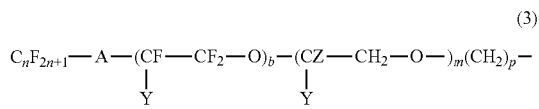  (3)

where A is an oxygen radical or a chemical bond; n is 1 to 6; Z is H or F; Y is H, F, $C_nH_{2n+1}$ or $C_nF_{2n+1}$; b is 2 to 20, m is 0 to 6, and p is 0 to 18, preferably 2 to 4 and more preferably 2.

The acid group can be an organic such as a carboxylic acid or an inorganic acid such as sulfuric acid or phosphonic acid or contain both organic and inorganic moieties, such as organo phosphonic acids or organo sulfuric and sulfonic acids. Preferably, X is:

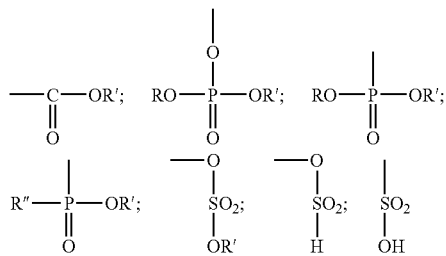

where R'' is a hydrocarbon or substituted hydrocarbon radical having up to 200, such as 1 to 30 and 6 to 20 carbons, R'' can also include the perfluoroalkyl groups mentioned above, and R and R' are H. The phosphorus acids, particularly phosphonic acids, are the most preferred.

For application to the surface of a metallic substrate, the perfluorinated acid is dissolved or dispersed with the aid of a surfactant in a diluent comprising a mixture of water and an organic solvent.

Suitable surfactants or surface active agents include any of the well-known anionic, cationic or nonionic surfactants. Mixtures of such materials where compatible can be used.

Suitable cationic surfactants include, but are not limited to lauryl pyridinium chloride, cetyldimethyl amine acetate, and alkyldimethylbenzylammonium chloride, in which the alkyl group has from 8 to 18 carbon atoms. Suitable anionic surfactants include, but are not limited to alkali fatty alcohol sulfates, such as sodium lauryl sulfate, and the like; arylalkyl sulfonates, such as potassium isopropylbenzene sulfonate, and the like; alkali alkyl sulfosuccinates, such as sodium octyl sulfosuccinate, and the like; and alkali arylalkylpolyethoxyethanol sulfates or sulfonates, such as sodium octylphenoxypolyethoxyethyl sulfate, having 1 to 5 oxyethylene units, and the like. Suitable non-ionic surfactants include but are not limited to alkyl phenoxypolyethoxy ethanols having alkyl groups of from about 7 to 18 carbon atoms and from about 6 to about 60 oxyethylene units such as, for example, heptyl phenoxypolyethoxy ethanols; ethylene oxide derivatives of long chained carboxylic acids such as lauric acid, myristic acid, palmitic acid, oleic acid, and the like, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections.

Preferred surfactants are non-ionic surfactants and more preferably perfluorinated surfactants. Examples of such surfactants are ethylene oxide derivatives of perfluorinated alcohols containing from 6 to 60 oxyethylene units, that is,

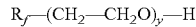

where $R_f$ is a perfluorinated hydrocarbon group and y is equal to 6 to 60.

Examples of suitable perfluorinated hydrocarbon groups are those of the structure:

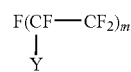

where Y is F or $C_nF_{2n+1}$; m is 4 to 20 and n is 1 to 6.

Such materials are commercially available from E.I. duPont de Nemours and Company as ZONYL FS-300 and ZONYL FSN 100.

The diluent for the composition is a mixture of an organic solvent and water. Examples of organic solvents are polar organic solvents, for example, alcohols such as methanol and ethanol, ketones such as methyl ethyl ketone, ethers such as tetrahydrofuran, and esters such as ethyl acetate. Preferred polar organic solvents are glycol ethers. Examples of glycol ethers are mono and dialkylethers of ethylene glycol and propylene glycol and oxyalkylated derivatives thereof such as diethylene glycol and dipropylene glycol and in which the alkyl group typically contains from 1 to 6, preferably 1 to 4 carbon atoms. Specific examples of glycol ethers are the monobutyl ether of ethylene glycol and the dibutyl ether of diethylene glycol and the mono n-propyl ether of propylene glycol.

The components of the composition are typically present in admixture with one another in the following ranges:

(a) 0.1 to 10, preferably 0.5 to 2 percent by weight of the perfluorinated acid, (b) 0.1 to 10, preferably 0.5 to 2 percent by weight of the surfactant, (c) 2.0 to 30, preferably 5 to 15 percent by weight of the organic solvent, and (d) 50 to 95, preferably 75 to 95 percent by weight of water; the percentages by weight being based on total weight of (a), (b), (c) and (d).

To prepare the compositions of the invention, the perfluorinated acid, surfactant and organic solvent are typically premixed with vigorous agitation and then added to the water with high shear mixing. Depending on the selection of the components and their relative amounts, the composition can be in the form of a dispersion or a solution. Particle size ranges from 1 nanometer to 5 microns. More typically the particle size ranges from 5 to 500 nanometers.

The compositions prepared as described above can be applied to the metallic substrate by immersion of the substrate in the composition, spraying the composition on the substrate or applying the composition to a carrier such as a roller or felt pad and then wiping the substrate with the carrier.

Preferably the composition is applied to the substrate with heating. For example, the composition or substrate can be preheated before application, or the composition can be applied to the substrate and the coated substrate heated in inductive or IR heating. Heating, although helpful in the formation of the self-assembled film as described below, does not have to be high. Temperatures on the order of 50 to 70° C. are typical although higher temperatures up to 300° C. can be used.

Preferably, before application of the composition to the substrate, the metallic substrate is thoroughly cleaned so as to expose a fresh surface with metal oxide and optionally hydroxide groups. Preferably, the cleaning operation involves an abrasion of the metallic surface by the application of an aqueous slurry of abrasive particles to the substrate surface and rubbing the slurry across the surface of the substrate with a suitable pad. Suitable abrasive materials are silica, alumina, titania and ceria, with ceria (cerium oxide) being preferred. After rubbing, the cleaned substrate is rinsed with water to remove the abrasive particles. Besides rubbing with abrasive particles, the surface can be cleaned by treatment with caustic followed by rinsing to remove any residual caustic.

After application of the composition to the metallic substrate, the water and organic solvent are evaporated and a thin film of about 0.5 to 100 nanometers is formed. Preferably the solution is heated to 50° C. and applied to the surface by rubbing with polyester felt then rinsing the excess solution with clean water. The resulting layer is hydrophobic having a water contact angle greater than 70° C., typically from 75 to 130° C. The water contact angle can be determined using a contact angle goniometer. The perfluorinated acid forms a self-assembled layer, which for the most part is a monolayer on the surface of the metallic substrate. The self-assembled film is formed by the adsorption and spontaneous organization of the perfluorinated acid on the substrate surface. The perfluorinated acids are amphiphilic molecules that have two functional groups. The first functional group is the head group, that is, the acid group that attaches by a covalent bonding to the oxides and optionally to the hydroxyl groups present on the substrate surface. The second functional group is the perfluoro group, the tail group, is covalently bonded to the first functional group and extends outwardly in a substantially perpendicular direction from the substrate and in which the perfluorinated groups are substantially parallel to one another.

The following Examples show the preparation of various compositions of the invention, the application of the compositions to stainless steel substrates and to the performance of the coated substrates for hydrophobicity and stain repellency.

EXAMPLES

Example 1

A 1% dispersion of the perfluorinated phosphonic acid ("PFPA") having the following structure:

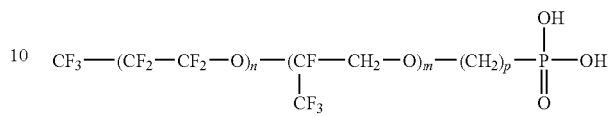

where n is equal to 1 to 14, m is equal to 1, and p is equal to 3, was prepared by mixing 10 grams (g) of the PFPA with 10 g of the perfluorinated surfactant ZONYL FS-100, 100 g of the mono n-propyl ether of propylene glycol (DOWNFALL PAP) and 880 g of distilled water. The first three ingredients were premixed with vigorous agitation and added to the deionized water with high shear mixing for 10 minutes resulting in a hazy dispersion.

A 3"×5" piece of #4 brushed stainless steel (430 alloy, Main Steel) was coated using the above-described formulation using the following process. A few drops of a 50% suspension of cerium oxide ("Super Ceria" from Covington Engineering) on a F1 white felt pad (McAlester Carry) was used to clean the stainless steel surface of contaminants (PSA residues, milling and cutting oils left from processing) by gently buffing the surface for 5 seconds and exposing a fresh layer of surface oxide. The excess ceria was rinsed from the surface using tap water followed by a final rinse in distilled water and blown dry with oil-free compressed air. Then, the cleaned substrate was coated by buffing the surface with a second F1 felt pad saturated with the dispersion at a temperature of 60° C. for 10 seconds to deposit a self-assembled monolayer having a thickness of about 5 nanometers (nm). The performance of the coated substrate was then evaluated by water contact angle and stain repellency tests as reported in the table below.

Example 2

A 0.2 percent by weight dispersion of the PFPA of Example 1 was prepared in the manner of Example 1 above using 2 g of the PFPA, 2 g of the fluorinated surfactant ZONYL FSN, 50 g of the monobutyl ether of ethylene glycol and 946 g of distilled water. A hazy dispersion resulted.

A 3"×5" piece of #4 brushed stainless steel (430 alloy, Main Steel) was coated using the above-described formulation using the following process. The stainless steel surface was cleaned of contaminants (PSA residues, milling and cutting oils left from processing) by dipping the panel into a solution of 3% potassium hydroxide in distilled water at 60° C. for 30 seconds so as to expose a fresh layer of surface oxide. The panel was then rinsed extensively with tap water followed by a final rinse with distilled water. The panel was then blown dry with oil-free compressed air. Then, the cleaned substrate was coated by dipping the panel into the dispersion at 60° C. for 30 seconds to deposit a self-assembled monolayer having a thickness of about 5 nanometers (nm). The performance of the coated substrate was then evaluated by water contact angle and stain repellency tests as reported in the table below.

Example 3

The formulation from Example 2 was used to coat a 3"×5" piece of #4 brushed stainless steel; however, the metal was subjected to 150° C. for 30 seconds before application of the coating. The performance of the coated substrate was then evaluated by water contact angle and stain repellency tests as reported in the table below.

Example 4

Comparative

A 3"×5" piece of #4 brushed 430 stainless steel coated with a commercially-available polyester-based 'antifingerprint' coating was obtained and evaluated using the (below) performance tests for comparison.

Water contact angle (WCA): A drop of water (approx 10 uL) is placed onto the surface, and the interior angle of contact between the water droplet and the surface is measured as in U.S. Pat. No. 5,268,733 using a Tantec CAM MICRO (Tantec). Materials with low surface energies will typically have high water contact angles; stain repellant coatings typically have water contact angles of greater than 105 degrees.

Stain repellency: In this test, the ability of the surface to repel organic matter is approximated. An X mark is drawn across the panel surface using a black fine point Sharpie marker and the ink is allowed to dry for five minutes. Then using a clean lint-free tissue, the surface is rubbed in a back and forth manner using a 300 g/cm² force ten times. The amount of ink removed is judged on a 0-5 scale, with 5 being the highest performance (all visible ink removed) and 0 being the lowest (no ink removed).

| Example | WCA | Stain Repellency |
|---|---|---|
| Control Blank 430 SS | 60 | 0 |
| 1 | 118 | 5 |
| 2 | 118 | 5 |
| 3 | 118 | 5 |
| 4 | 72 | 1 |

What is claimed is:

1. A composition for providing a hydrophobic coating to a metal substrate comprising:
   (a) 0.1 to 10 percent by weight of a phosphorus acid having perfluorinated hydrocarbon groups capable of forming a self-assembled monolayer on the metal substrate,
   (b) 0.1 to 10 percent by weight of a surfactant that is structurally different from (a),
   (c) 2 to 30 percent by weight of an organic solvent, and
   (d) 50 to 95 percent by weight water;
   the percentages by weight being based on the total weight of (a), (b), (c) and (d).

2. The composition of claim 1 in which the acid having perfluorinated hydrocarbon groups is selected from an organo phosphoric acid, an organo phosphinic acid and an organo phosphonic acid.

3. The composition of claim 1 in which the acid having perfluorinated hydrocarbon groups is of the structure:

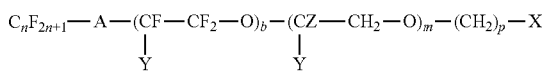

where A is an oxygen radical or a chemical bond; n is 1 to 20; Y is H, F, $C_nF_{2n+1}$, $C_nH_{2n+1}$; Z is H or F; b is 0 to 50; m is 0 to 50; p is 1 to 20; and X is a group selected from a phosphoric acid, a phosphinic acid and a phosphonic acid.

4. The composition of claim 3 where b is 0, m is 0, and p is 1 to 12.

5. The composition of claim 3 where b is 2 to 50; m is 1 to 20; and p is 1 to 12.

6. The composition of claim 1 in which the surfactant is non-ionic.

7. The composition of claim 1 in which the surfactant is an at least partially fluorinated surfactant.

8. The composition of claim 7 in which the surfactant is an ethylene oxide derivative of a perfluorinated alcohol.

9. The composition of claim 8 in which the surfactant is of the structure:

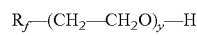

where $R_f$ is a perfluorinated hydrocarbon group and y is equal to 6 to 60.

10. The composition of claim 1 in which the organic solvent is selected from alcohols, ketones, esters and glycol ethers.

11. The composition of claim 10 in which the solvent is a glycol ether.

12. The composition of claim 11 in which the glycol ether is a monoalkyl ether of glycols selected from ethylene glycol and propylene glycol including oxyalkylated derivatives thereof.

13. The composition of claim 1 in which the acid having perfluorinated hydrocarbon groups is of the structure:

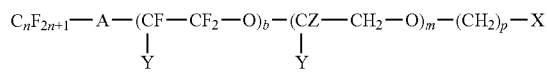

where A is an oxygen radical or a chemical bond; n is 1 to 20; Y is H, F, $C_nF_{2n+1}$, $C_nH_{2n+1}$; Z is H or F; b is 2 to 50; m is 1 to 20; p is 1 to 20; and X is a group selected from a phosphoric acid, a phosphinic acid and a phosphonic acid.

14. A method of applying a hydrophobic coating on a metal substrate comprising:
   (a) contacting the surface of the substrate with the composition of claim 1,
   (b) coalescing the composition on the substrate surface to form a substantially continuous film, while
   (c) removing organic solvent and water from the film so as to adhere the perfluorinated acid to the substrate surface.

15. The method of claim 14 in which steps (b) and (c) are accompanied by heating.

16. The method of claim 15 in which heating is conducted at a temperature of 50-300° C.

17. The method of claim 14 in which the fluorinated acid is covalently bonded to the metal substrate.

18. The method of claim 14 in which the fluorinated acid is adhered to the substrate in the form of a self-assembled monolayer.

19. The method of claim 14 in which the composition comprises:
(a) 0.5 to 2 percent by weight of a perfluorinated acid capable of forming a self-assembled monolayer on the metal substrate,
(b) 0.5 to 2 percent by weight of a surfactant,
(c) 0.5 to 15 percent by weight of an organic solvent, and
(d) 75 to 95 percent by weight water;
the percentages by weight being based on total weight of (a), (b), (c) and (d).

20. The method of claim 14 in which the substrate is cleaned prior to deposition of the perfluorinated acid.

21. The method of claim 20 in which the substrate is cleaned by polishing with a dispersion of metal oxide particles.

22. The method of claim 21 in which the metal oxide is cerium oxide.

* * * * *